G. W. CRANE.
MANURE SPREADER.
APPLICATION FILED JUNE 14, 1907.
908,207.
Patented Dec. 29, 1908.
4 SHEETS—SHEET 3.
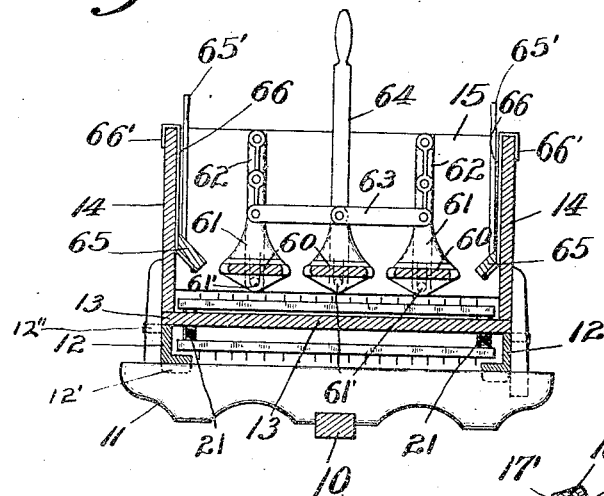
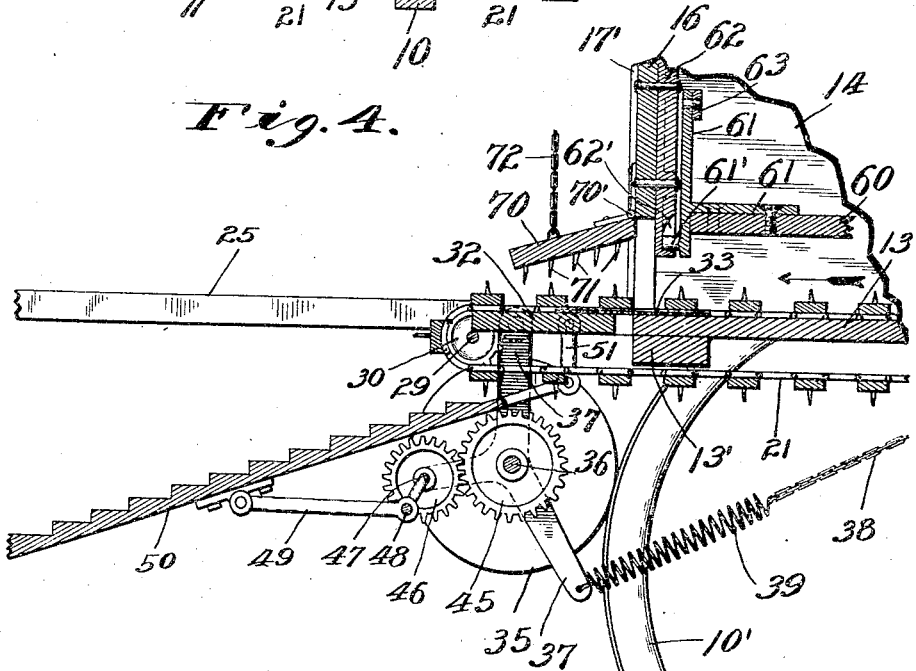
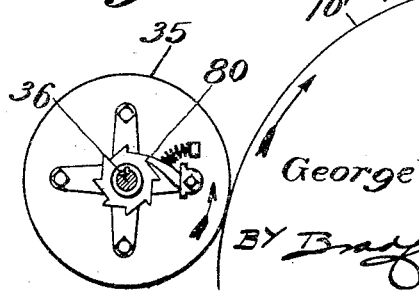
Witnesses
Frank A. Fahl
Thomas W. McMeans
Inventor
George W. Crane
By Bradford Hood
Attorneys

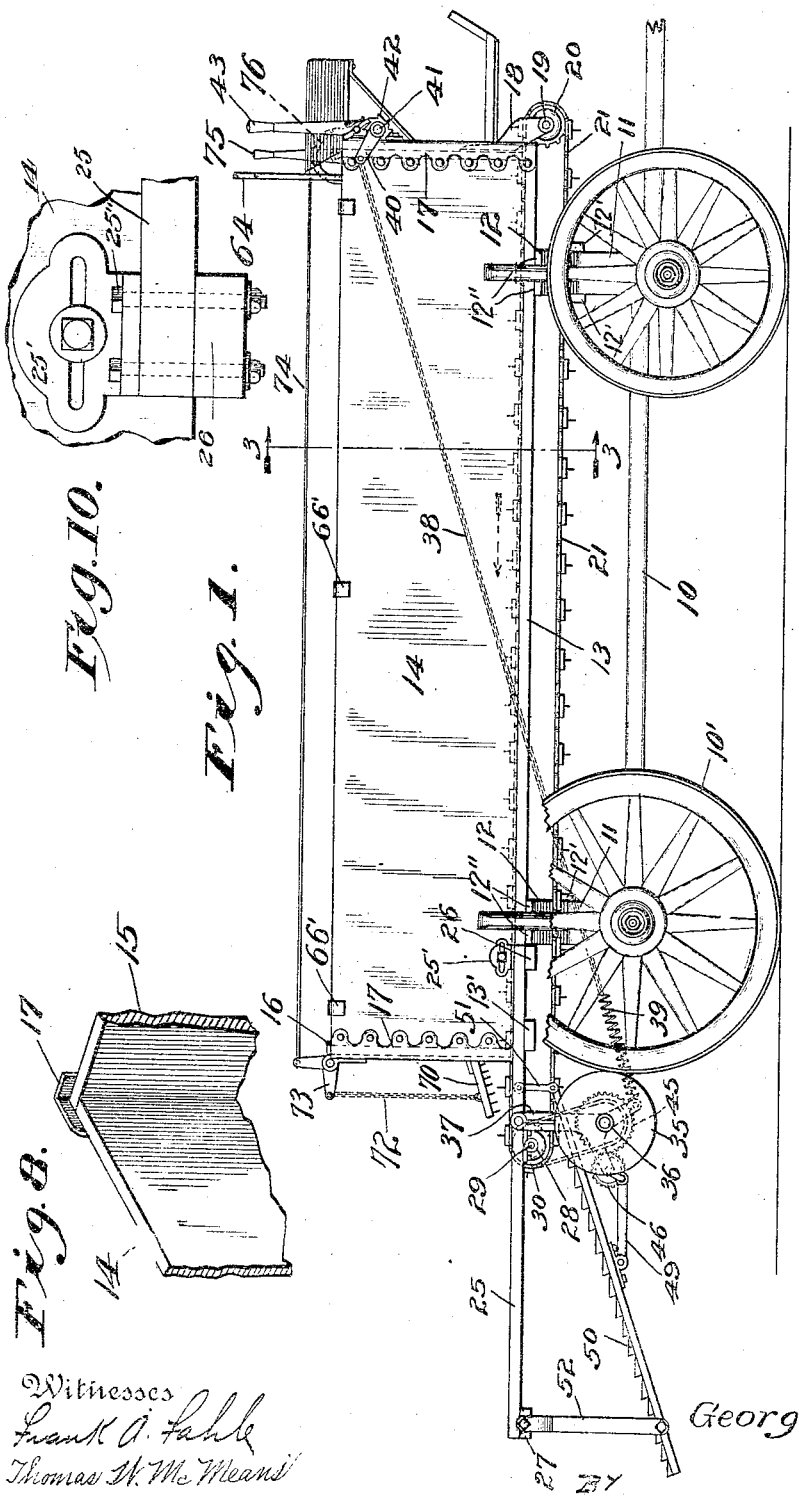

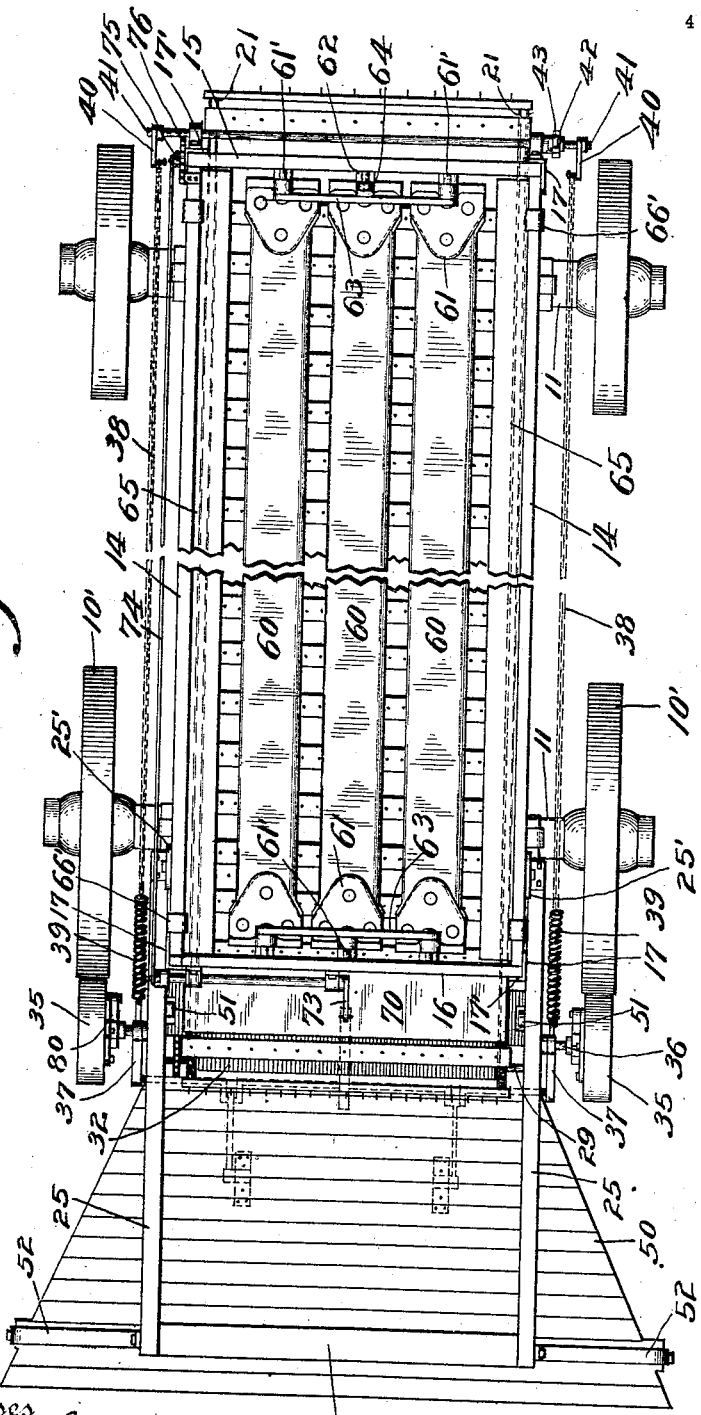

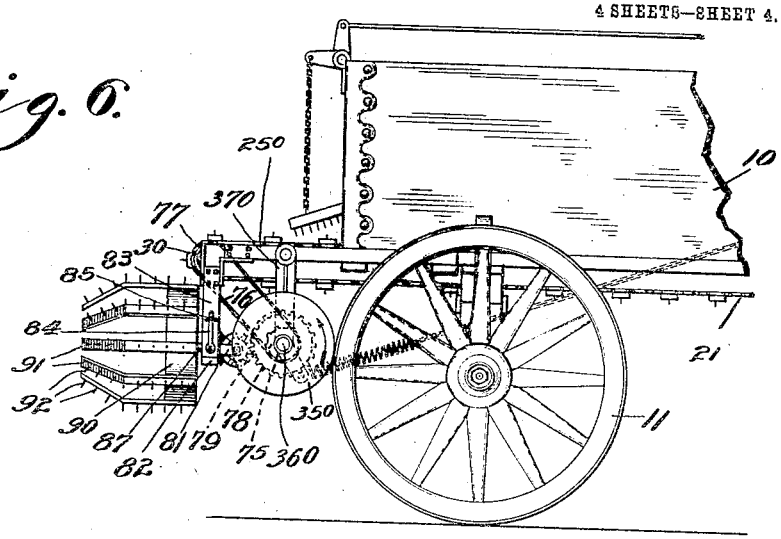
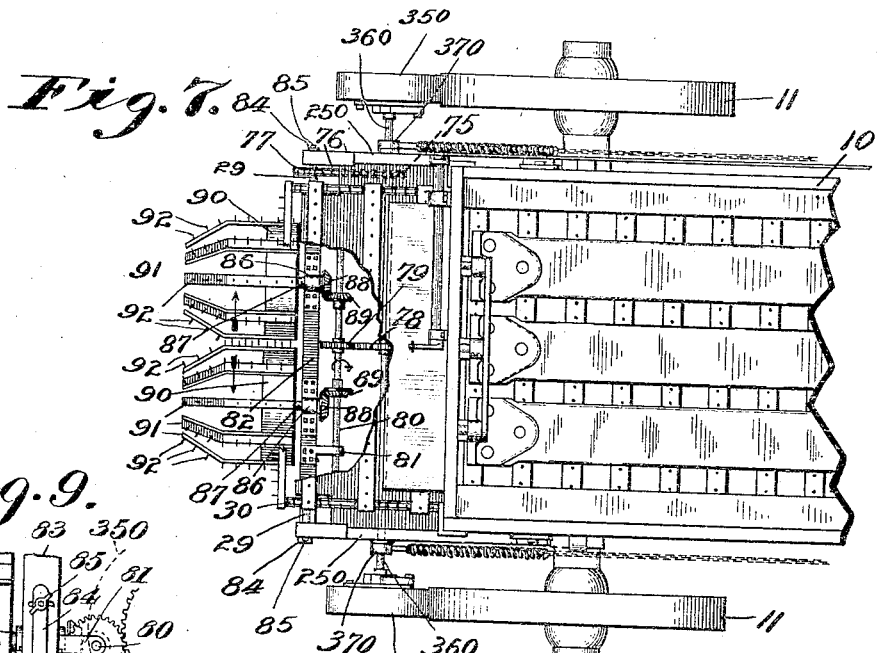
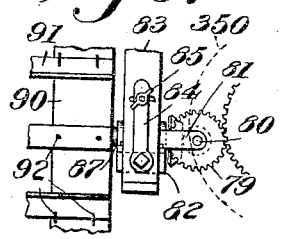

UNITED STATES PATENT OFFICE.

GEORGE W. CRANE, OF VEEDERSBURG, INDIANA.

MANURE-SPREADER.

No. 908,207.       Specification of Letters Patent.       Patented Dec. 29, 1908.

Application filed June 14, 1907. Serial No. 379,019.

*To all whom it may concern:*

Be it known that I, GEORGE W. CRANE, a citizen of the United States, residing at Veedersburg, in the county of Fountain and State of Indiana, have invented certain new and useful Improvements in Manure-Spreaders, of which the following is a specification.

The object of my invention is to produce a manure spreader capable of spreading uniformly on the ground in a swath considerably wider than the carrying vehicle.

A further object of my invention is to provide a construction whereby the greater portion of the weight of the manure will be temporarily supported independently of the feeding mechanism.

A further object of my invention is to so construct the various operating parts that they may readily be detached from and attached to a box-bed so that the said box-bed may be used for ordinary transporting purposes.

A further object of my invention is to produce such improvements in details of construction as will be hereinafter pointed out.

The accompanying drawings illustrate my invention:

Figure 1 is a side elevation of my improved structure; Fig. 2 is a plan; Fig. 3 a cross-section on line 3—3 of Fig. 1; Fig. 4 a vertical section of the rear end; Fig. 5 a detail of the driving mechanism; Fig. 6 a side elevation of a modified spreading device; Fig. 7, a plan, Fig. 8, details, and Fig. 9 a detail of the adjusting means for bar 82; Fig. 10 a detail of the connection between the side bars and inner end bar of the removable spreader supporting frame.

In the drawings 10 indicates an ordinary running gear of a box-bed wagon provided with front and rear bolsters 11. Mounted upon these bolsters are removable brackets 12 upon which the bottom 13 of the box-bed is adapted to rest somewhat above the top of the bolsters in order to form a passage way for the feeding belt. Each bracket 12 is provided at its base with a pair of depending lips 12' which straddle the bolster 11, and at its upper end is provided with a pair of horizontally projecting fingers 12" adapted to straddle the vertical posts of the bolster, the arrangement being such that the brackets may be readily removed but also such that they will stay put when in position shown in Fig. 3. The box-bed is composed of bottom 13, the sides 14—14, the front end board 15 and the rear end board 16. In order that the front and rear boards may be readily removed so as to permit the insertion of other similar boards when the spreading attachment is not in use, I secure to each end of each side board a casting 17 having an inturned lip or flange 17', which lies a sufficient distance from the end of the side board to permit the insertion of the end board. Secured to the front board 15 are two depending brackets 18 in which is journaled a shaft 19 carrying an idler wheel or roller 20 over which passes an endless feeding belt 21, the upper side of said belt lying upon and adapted to traverse the bottom 13 of the bed while the lower side of said feeding belt passes beneath said bottom 13 and over the tops of the bolsters 11. Resting upon the rear cross bar 13' of the bed are bars 25 and the front ends of these bars are connected by a cross-piece 26 adapted to pass beneath the bottom 13 of the bed, thus holding the side bars 25 in position. Bar 26 is detachably connected to the inner ends of bars 25 by bolts 25" which bolts also pass through and hold in position a bracket 25' adapted to be bolted to the side of a wagon bed, a bolt 100 passing through a slot 101 formed in said bracket so that the frame may be longitudinally adjusted and held in any desired position. The rear ends of the side bars 25 are connected by a cross bar 27. Mounted upon bars 25 are bearing brackets 28 in which is journaled shaft 29 carrying wheel or roller 30 over which the conveyer 21 passes. Secured to bars 25 is a crossboard 32 adapted to form a continuation of the bottom 13 of the wagon bed, the gap between the adjacent edges of the two portions 13 and 32 being conveniently covered by a short thin sheet of iron 33.

The conveyer 21 is driven from the ground wheels of the running gear and, for this purpose, I have shown in the accompanying drawings, the following mechanism. Each of the rear wheels 10' of the running gear is adapted to be engaged by a friction wheel 35, the two wheels being carried by a shaft 36 journaled in suitable bearings in brackets 37 pivotally supported at their upper ends on the arms 25. In order to hold the wheel 35 against wheels 10' I provide, on each side of the vehicle, a chain 38 provided at its rear end with a spring 39 attached to the adjacent bracket 37. The forward end of chain 38 is attached to the inwardly projecting wrist pin of a crank 40 attached to a shaft 41 rotatably supported in suitable bearing brackets carried by the front board 15. Secured to shaft 41 is a ratchet wheel 42 adapted to be operated by a ratchet lever 43, the arrangement of the shaft 41 and crank 40 being such that a half rotation of the shaft from the position shown in Fig. 1 will take up all the slack in chain 38 and further rotation of shaft 41 will cause the chain to wrap around said shaft and thus permit any desired tension to be readily applied to the springs 39. The pull of chains 38 on levers 37 tends to shift arms 25 to the rear and thus tighten carrier 21, and when the desired tension in said carrier has been reached, brackets 25', carried by arms 25, are bolted to the side boards 14, as shown in Fig. 1. Secured to shaft 36 is a gear wheel 45 meshed with a gear 46 carried by a crank shaft 47, the cranks 48 whereof are connected by pitmen 49 to the shaking distributing table 50. The forward end of the table 50 is pivotally supported by links 51 and said forward end extends beneath the rear end of the conveyer 21 so as to receive the manure delivered therefrom. The rear end of the table 50 is supported by depending swinging links 52 the upper ends of which are pivotally attached to the cross-bar 27.

In order to support the greater portion of manure and thus relieve the carrier 21 from the load thereof, I provide a false bottom for the receptacle, said false bottom composed primarily of a plurality of pivotally supported slats 60 each of which is provided at each end with a bracket having a pivotal connection 61 with a bracket 62 adapted to be fastened to the front and rear boards 16. The several slat brackets 61 are connected at each end by links 63 and an operating lever 64 is provided at the forward end so that the slats 60 may be tilted from the horizontal and thus permit a limited quantity of the body of manure to pass between said slats and fall upon the conveyer 21. I also prefer to provide, along each side of the main bed, an inwardly and downwardly inclined supporting member 65 which is carried by the lower ends of several hangers 66 the upper ends 66' of which are adapted to hook over the upper edges of the sides 14 of the wagon bed, the arrangement being such that the members 65 may be readily attached and detached.

In order to further disintegrate the manure as it passes from the main bed, I provide a harrow 70 which is hinged at its forward upper edge to the back board 16 by a hinge 70'. This harrow 70 is provided with downwardly projecting teeth 71 beneath which the manure is carried by the conveyer 21 and said harrow is adjustably held in position by means of a chain 72 the upper end of which is attached to one arm of a lever 73, pivotally mounted upon the upper edge of back board 16, the other arm of said lever 73 being connected by link 74 with an adjusting lever 75 held in desired position of adjustment by segment 76.

In order to facilitate the turning of the vehicle the friction wheels 35 are connected to the shaft 36 by a ratchet connection 80, as shown in Fig. 5.

In operation the main body of manure is supported upon slats 60 and said slats may be set at such angle from the horizontal that there will be a continual tendency of the manure to move downward on the carrier 21. Said carrier is driven in the direction indicated by the arrow by a forward movement of the vehicle and carries a continuous stream of manure from the main body back beneath harrow 70 and discharges the same upon the spreading table 50. The reciprocation of the spreading table 50 causes a further disintegration of the manure and causes it to move downward and slide laterally until it drops from the rear end of the table upon the ground. When it is desired to use the wagon bed alone, the conveyer 21, which may be of ordinary link belt, is broken at any desired point and chains 38 are disconnected from cranks 40. Thereupon slats 60 may be lifted bodily from their brackets 62, the pintles 61' lying in sockets 62' which are open at their upper ends, as clearly shown in Fig. 4, and the members 65 are withdrawn. The front board 15, carrying with it shafts 41 and 19, and also all the parts in connection therewith, may be readily removed and end board 16, carrying with it the harrow 70 and the operating lever 73, as well as the brackets 62, secured to the inside thereof, removed, and the frame formed of the parts 25, 26 and 27, carrying with it the spreading table, and the several driving shafts, may be readily removed whereupon, by inserting ordinary end boards in place of the end boards 15 and 16, the bed becomes available as an ordinary box-bed, the peculiar casting 17 making available the entire length of the bed without waste. Brackets 12 are removable and the bed drops vertically between side posts on to the bolsters.

In the modification, shown in Figs. 6 and 7, the side bars 250 run lengthwise the bed 10 and are similar to bars 25, and form part of frame like that comprising the bar 25. Suspended from the side bars 250 are brackets 370 which, at or near their lower ends, are provided with bearings for a shaft 360 provided at each end with a driving wheel 350 like wheels 35. Shaft 360 is provided with a gear 75 connected by a chain 76 with a gear 77 carried by the shaft 29 of roller 30. Shaft 360 is also provided with a gear 78 which meshes with a gear 79 carried by a shaft 80. Shaft 80 is supported in suitable brackets 81 carried by a cross-bar 82 pivotally mounted between depending brackets 83 carried by the rear end of frame 250. Bar 82 may be angularly adjusted, through a small angle, by means of a lever 84, said lever being held in any desired position of adjustment by a pin 85. Journaled in bearings 86 on bar 82, with axes substantially parallel with the vehicle, are shafts 87 each of which carries at its rear end a gear 88 adapted to mesh with the corresponding gear 89 carried by shaft 80. Secured to the rear end of each shaft 87 is a spreader drum 90 the main body of which is composed of fingers 91 provided with radially extending teeth 92, and the arrangement being such that the rotation of shaft 80, by a forward movement of carrying wheels 11, will cause said drum 90 to rotate in opposite directions from the center, as indicated by arrows in the drawings, and thus throw upwardly and outwardly any material deposited thereupon, a portion of the manure dropping directly down through the fingers 91.

In operation: The manure drawn from the bed 10 by the carrier 21 will be deposited by said carrier upon the drums 90 and said drum, rotating upon a substantially horizontal axes in opposite directions, will serve to throw the manure with considerable force upwardly and transversely so as to spread the manure over a considerable width of ground. The manure striking the drum near the medial line of the vehicle will be thrown farther than that which strikes the drums outside of their medial line, as will be readily apparent. The throwing action may also be slightly modified by an angular adjustment of bar 83 so that the axes of the drums will be held above or below the normal horizontal position.

The fitting 17 may conveniently be of sufficient length to project above the upper edge of the side boards, as shown in Fig. 8, so as to permit the addition of supplemental side-boards. I prefer also to hinge the boards 65 to the lower ends of brackets 66, and attach to the forward ends of said boards 65 a lever 65' by means of which the board may be swung so as to dump any material which may lodge thereon.

I claim as my invention:

1. The combination, with a vehicle and the box-bed thereof, of an endless carrier adapted to traverse the bottom of said bed, a plurality of supporting slats pivotally arranged in said bed above the carrier in position to normally support the load in the bed, and means for swinging said slats to permit a portion of the load to pass between the same to the carrier.

2. The combination, with a vehicle and the box-bed thereof comprising the side boards, and the removable end boards, of load supporting slats arranged in said bed above the bottom thereof, brackets carried by said removable end boards, and pivot members carried by said slats and coöperating with said brackets.

3. The combination, with a vehicle and the box-bed thereof comprising the side boards, and the removable end boards, of load supporting slats arranged in said bed above the bottom thereof, brackets carried by said removable end boards, pivot members carried by said slats and coöperating with said brackets, and an endless carrier adapted to traverse the box-bed beneath the slats.

4. The combination, with a vehicle and the box-bed thereof comprising the side boards, and the removable end boards, of load supporting slats arranged in said bed above the bottom thereof, brackets carried by said removable end boards, pivot members carried by said slats and coöperating with said brackets, an endless carrier adapted to traverse the box-bed beneath the slats, brackets carried by one of said removable end boards, and a roller journaled in said brackets and adapted to support one end of said carrier.

5. The combination, with a vehicle and the box-bed thereof, of an endless carrier adapted to traverse the bottom of said bed, a driving train for said carrier, said train comprising a friction wheel adapted to engage a carrying wheel of the vehicle, a spring tension device for said friction wheel, and means for applying said tension device comprising a rotatable shaft carrying a crank having a wrist pin projecting over a portion of said shaft, a flexible connection between said spring tension member and the wrist pin, and means for rotating said shaft and holding the same in any desired position.

6. The combination, with a vehicle and the box-bed thereof, of an endless carrier adapted to traverse the bottom of said bed, a driving train for said carrier, said train comprising a friction wheel adapted to engage a carrying wheel of the vehicle, a spring tension device for said friction wheel, means for applying said tension device comprising a rotatable shaft carying a crank having a wrist pin projecting over a portion of said shaft, and a flexible connection between said spring tension member and the wrist pin.

7. The combination, with a vehicle and the carrying bed thereof, of mechanism for discharging the load from said bed, a driving train for said discharging mechanism, said driving train comprising a friction element, a flexible tension member for said friction element, a rotatable shaft provided with an eccentric wrist pin lying over said shaft and to which wrist pin the tension member is connected, and means for rotating said shaft for the purpose set forth.

8. The combination, with a vehicle and the carrying bed thereof provided near its rear end with transverse projections 13', of a frame comprising a pair of side bars, adapted to rest upon said projections, a cross bar detachably secured to the inner ends of said side bars and passing beneath the wagon bed, longitudinally slotted brackets carried by said side bars, and bolts passing through said slots and engaging the wagon bed, substantially as and for the purpose set forth.

9. The combination, with a vehicle and the carrying bed thereof, of an endless carrier adapted to traverse the bottom of the bed, a removable end board forming part of the wagon bed, and a harrow board adjustably mounted on said end board in position to coöperate with the endless carrier.

10. The combination, with a vehicle and the carrying bed thereof, of an endless carrier adapted to traverse the bottom of the bed, means arranged within said bed above the carrier for normally supporting the major portion of the load, a removable end board forming part of the wagon bed, and a harrow board adjustably mounted on said end board in position to coöperate with the endless carrier.

11. The combination, with a vehicle comprising a running gear and a box bed therefor, of means for vertically adjusting said box-bed consisting of brackets 12 having projections to straddle the bolster and other projections to straddle the bolster post and removably mounted upon the bolsters of the running gear and adapted to support the box-bed with its bottom a distance above the tops of the bolsters, an endless carrier mounted on said bed with its upper side traversing the bottom of the bed and its lower side traversing the space between the bottom of the bed and the tops of the bolsters.

12. The combination, with a vehicle, of a pair of rotary throwing drums mounted upon substantially longitudinal axes and arranged in the clear in position to receive material from the vehicle, and means for rotating said drums in opposite directions, upper sides outwardly.

13. The combination, with a vehicle, of a pair of rotary throwing drums mounted upon substantially longitudinal axes and arranged in the clear in position to receive material from the vehicle, means for adjusting the said axes slightly from the horizontal and means for rotating said drums in opposite directions upper sides outwardly.

14. The combination, with a vehicle, and the box-bed thereof, of a spreader frame detachably connected to said box-bed, a pair of rotary throwing drums carried by the rear end of said frame upon substantially longitudinal axes and a driving train between the traction wheels of the vehicle and said drums for rotating said drums upper sides outwardly.

15. The combination, with a vehicle, and the box-bed thereof, of a spreader frame detachably connected to said box bed, said frame comprising a pair of side bars and a cross bar adapted to pass beneath the box-bed and connecting the forward ends of said side bars, a pair of rotary drums carried by the rear end of said frame upon substantially longitudinal axes and a driving train between the traction wheels of the vehicle and said drums for rotating said drums.

16. The combination, with a vehicle, and the box-bed thereof, of a spreader frame detachably connected to said box bed, a pair of rotary drums carried by the rear end of said frame upon substantially longitudinal axes, means for shifting said axes slightly from the horizontal and a driving train between the traction wheels of the vehicle and said drums for rotating said drums.

17. The combination, with a vehicle, and the box-bed thereof, of a spreader frame detachably connected to said box-bed, said frame comprising a pair of side bars and a cross bar adapted to pass beneath the box-bed and connecting the forward ends of said side bars, a pair of rotary drums carried by the rear end of said frame upon substantially longitudinal axes, means for shifting said axes slightly from the horizontal and a driving train between the traction wheels of the vehicle and said drums for rotating said drums.

18. The combination, with the box-bed of a vehicle, of a supplemental bottom plate extending lengthwise of the bed and hingedly connected to the lower ends of hangers adapted to be supported by the sides of the box-bed.

In witness whereof, I, have hereunto set my hand and seal at Veedersburg, Indiana, this 8 day of June, A. D. one thousand nine hundred and seven.

GEORGE W. CRANE. [L. S.]

Witnesses:
SAMUEL J. LUDLOW,
GEORGE MINICK.